United States Patent
Loporchio et al.

(10) Patent No.: US 7,478,480 B2
(45) Date of Patent: Jan. 20, 2009

(54) TOOL FOR SNAP-CUTTING BRITTLE PIPE

(76) Inventors: Vincent Loporchio, 3634 Bandell St., Acton, CA (US) 93510; Helga Loporchio, 2136 E. Chevy Chase Dr., Glendale, CA (US) 91206

(*) Notice: Subject to any disclaimer, the term of this patent is extended or adjusted under 35 U.S.C. 154(b) by 0 days.

(21) Appl. No.: 11/715,239

(22) Filed: Mar. 6, 2007

(65) Prior Publication Data
US 2008/0216325 A1 Sep. 11, 2008

(51) Int. Cl.
*B23D 21/08* (2006.01)
(52) U.S. Cl. .................... 30/92; 30/96; 30/100; 30/101
(58) Field of Classification Search .............. 30/92, 30/96, 100, 101; 82/46, 70.1, 70.2; 81/65.2, 81/177.2, 177.8, 180.1; 83/830–832, 863, 83/864, 879–887
See application file for complete search history.

(56) References Cited

U.S. PATENT DOCUMENTS

| | | | | |
|---|---|---|---|---|
| 444,995 A * | 1/1891 | Vanderman | .............. | 30/100 |
| 492,833 A * | 3/1893 | Porter | .............. | 30/100 |
| 538,072 A * | 4/1895 | Hall | .............. | 30/100 |
| 553,663 A * | 1/1896 | Anderson | .............. | 30/100 |
| 825,215 A * | 7/1906 | Holland | .............. | 30/100 |
| 930,755 A * | 8/1909 | Holland | .............. | 30/100 |
| 1,256,799 A * | 2/1918 | Hime | .............. | 30/100 |
| 1,428,712 A * | 9/1922 | Sanders | .............. | 30/100 |
| 1,872,199 A * | 8/1932 | Way | .............. | 30/101 |
| 2,704,096 A | 3/1955 | Olsen | | |
| 2,716,280 A * | 8/1955 | Ruhe | .............. | 30/100 |
| 2,835,969 A * | 5/1958 | Wheeler | .............. | 30/100 |
| 2,949,669 A * | 8/1960 | Wheeler | .............. | 30/100 |
| 2,950,035 A * | 8/1960 | Wheeler | .............. | 30/92 |
| 3,001,283 A * | 9/1961 | Woods et al. | .............. | 30/100 |
| 3,023,655 A * | 3/1962 | McDaniel | .............. | 30/100 |
| 3,027,638 A * | 4/1962 | Fightmaster | .............. | 30/100 |
| 3,129,865 A * | 4/1964 | Coblitz | .............. | 30/92 |
| 3,157,945 A * | 11/1964 | Picking | .............. | 30/100 |
| 3,166,620 A * | 1/1965 | Galezniak | .............. | 30/96 |
| 3,283,978 A * | 11/1966 | Coblitz | .............. | 30/100 |
| 3,307,760 A * | 3/1967 | Small et al. | .............. | 225/1 |
| 3,309,002 A | 3/1967 | Enos | | |
| 3,341,098 A | 9/1967 | Singley | | |

(Continued)

FOREIGN PATENT DOCUMENTS

CH 602289 A5 * 7/1978

(Continued)

*Primary Examiner*—Jason Daniel Prone
(74) *Attorney, Agent, or Firm*—Gene Scott; Patent Law & Venture Group

(57) ABSTRACT

A chain pipe-cutter is made up of chain links joined together by cross bars, the cross bars further engage cutting wheels. A pair of adapters each having a U-shaped body with a pair of longitudinally oriented legs joined together by a back portion from which the legs depend. The legs have holes so the adapters may engaged with one of the chain links at a terminal position on the chain by cross bars. The back portions providing a groove having a longitudinal orientation so that with the chain wrapped around a brittle pipe the adapters are positioned in near adjacency, and may be further forced into convergence by a tool engaging each of the longitudinal grooves to sever the pipe.

5 Claims, 5 Drawing Sheets

U.S. PATENT DOCUMENTS

| | | | |
|---|---|---|---|
| 3,430,830 A | | 3/1969 | Coblitz |
| 3,540,640 A | * | 11/1970 | Coblitz ........................ 30/100 |
| 3,564,711 A | * | 2/1971 | McFarland .................... 30/100 |
| 3,704,516 A | * | 12/1972 | Ono .............................. 30/96 |
| 3,763,559 A | | 10/1973 | Axbjer |
| 3,943,626 A | * | 3/1976 | Williams ...................... 30/100 |
| 4,271,591 A | | 6/1981 | Anbriot |
| 4,763,413 A | * | 8/1988 | Rothenberger ............... 30/100 |
| 5,461,955 A | * | 10/1995 | Weisshaar ..................... 30/100 |
| 6,122,827 A | * | 9/2000 | Whitaker ........................ 30/96 |
| 6,141,876 A | * | 11/2000 | Hamm ......................... 30/100 |
| 2002/0124710 A1 | * | 9/2002 | MacDonald ................. 83/879 |
| 2006/0137189 A1 | * | 6/2006 | Dole ........................... 30/100 |

FOREIGN PATENT DOCUMENTS

| | | | |
|---|---|---|---|
| EP | 300764 A2 | * | 1/1989 |
| EP | 427453 A1 | * | 5/1991 |
| GB | 2048746 A | * | 12/1980 |
| GB | 2059851 A | * | 4/1981 |
| JP | 60006306 A | * | 1/1985 |

* cited by examiner

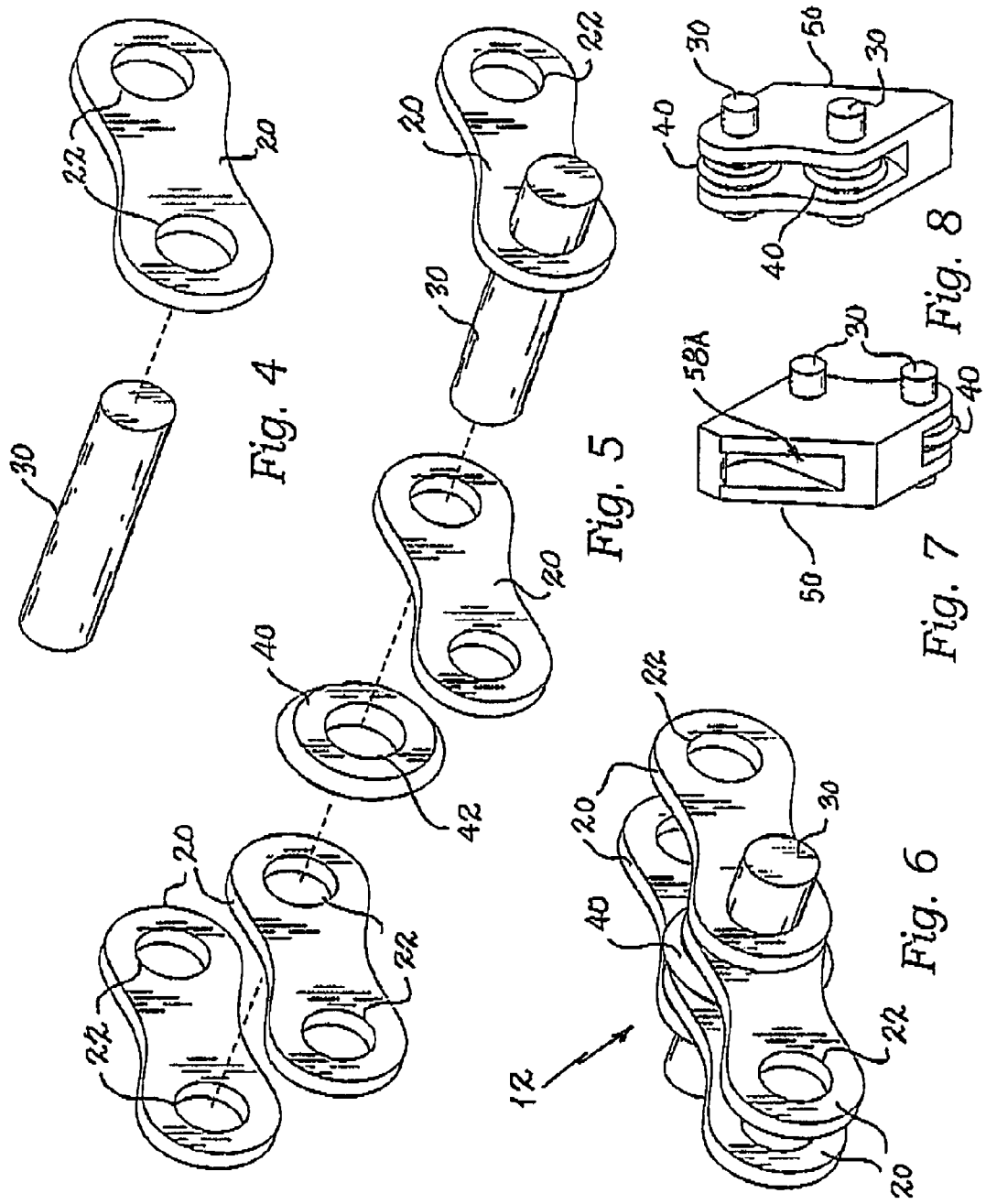

TOOL FOR SNAP-CUTTING BRITTLE PIPE

BACKGROUND OF THE INVENTION

1. Field of the Present Disclosure

This disclosure relates generally to cutting tools and devices and particularly to a chain link cutting apparatus for severing brittle pipe.

2. Description of Related Art including information disclosed under 37 CFR 1.97 and 1.98

Singley, U.S. Pat. No. 3,341,098, discloses a cutting tool for parting an elongated, fracturable member. It comprises a flexible, substantially nonextendible cutter adapted to be placed around and tension-squeezed against the fracturable member to fracture and part the it. A clamp for tensioning the cutter to squeeze and part the member upon a closing of the clamp is placed in spaced first and second clamp jaws. The cutter engaging means releasably engages a particular portion of the cutter after it is placed around the member, the particular portion being dictated by the size of the member; and a holder for the cutter remote from the first clamp jaw. The holder includes a means for indicating the size of the member for engagement with the cutter engaging means.

Coblitz, U.S. Pat. No. 3,430,830, discloses a cutting chain disposed to be wrapped around and tension-squeezed against a pipe for cutting into the pipe. The chain includes a series of spaced apart side links and a plurality of transversely disposed pins connecting the series of side links together. The cutting elements are disposed between the spaced apart side links and are mounted respectively on the pins, the cutting elements respectively having substantially circumferentially directed cutting edge means disposed to be tension-squeezed against the pipe for cutting it. The circumferentially directed cutting edge respectively resides in substantially a circle with the circles being substantially of the same diameter and with each circle surrounding a pin upon which the cutting elements are respectively mounted. At least a selected one of two adjacently disposed cutting elements comprises substantially a segmental circular body having at least a chordally directed edge clearance surface and segmental cutting edge means encompassing less than 360 degrees. The chordally direct edge clearance surface clears the other of the two adjacently disposed cutting elements with the circles in which the two adjacently disposed cutting elements respectively residing so as to intersect each other.

Anbriot, U.S. Pat. No. 4,271,591, discloses a chain pipe-cutter equipped to cut all kinds of material. The chain pipe-cutter includes a tensioner which is a deformable system formed by a cylindrical rod fast with a support, a slider slidably mounted on the rod, the support bearing four articulated rockers connected to the slider in pairs by two links and having their lower ends shaped as hooks to permit attachment of the chain thereon. The cylindrical rod cooperates with a handle through the agency of a screw-thread and said handle is formed by two superimposed cylindrical elements having four superimposed lobes arranged in cruciform-fashion.

Axbjer, U.S. Pat. No. 3,763,559, discloses an improvement in pipe cutting apparatus of the type having a number of cutting elements mounted for rotation on pins which also pivotally connect together the links of a roller type chain. A means for tightening the chain around the pipe during a pipe cutting operation, and means for moving the chain around the pipe is provided. The improvement resides in the fact that the chain tightening means is provided with parts which present co-acting guide surfaces adapted to align the ends of the chain length with respect to each other. Further, means are provided for adjusting the distance between the side links of each chain link and for locking the side links in the adjusted position.

Enos, U.S. Pat. No. 3,309,002, discloses an apparatus for cleaving an elongated fracturable member comprising, a handle, a compressed air supply system affixed to one end of the handle, a compressed air distribution system affixed to the other end of the handle, a means for regulating the flow of compressed air through the handle into the air distribution system, a flexible non-extensible chain mechanism adapted to be placed in close juxtaposition about the circumference of the fracturable member, and a means for tightening the chain mechanism. The air distribution system is in communication with the pneumatic cleaving means, whereby when compressed air is supplied to the pneumatic cleaving means the cleaving means is adapted to separate portions of the fracturable member.

The related art described above discloses the use of chain cutters for use on brittle and fracturable materials and especially pipes. This art shows the use of cutting wheels mounted in flexible chains which are mounted around pipes so that their ends may be forced into convergence thereby generating radial pressure points to sever the pipes. However, the related art fails to disclose a chain cutter with terminal adapters such as described herein whereby the ends may be drawn together more easily and wherein the adapters are able to engage so as to keep the chain cutter positioned on a true circle. The present disclosure distinguishes over the prior art providing heretofore unknown advantages as described in the following summary.

BRIEF SUMMARY OF THE INVENTION

This disclosure teaches certain benefits in construction and use which give rise to the objectives described below.

The present invention is a compact tool easily carried to a job site and easily used to quickly sever a brittle pipe. The tool is a chain pipe-cutter made up of chain links joined together by cross bars, the cross bars further engaging cutting wheels. A pair of adapters each have a U-shaped body with a pair of longitudinally oriented legs joined together by a back portion from which the legs depend. The legs have holes so the adapters may engage with one of the chain links at a terminal position on the chain by the cross bars. The back portions each provide a groove having a longitudinal orientation so that with the chain wrapped around a brittle pipe the adapters are positioned in near adjacency, and may be further forced into convergence by a hand tool such as a specialty pliers engaging each of the longitudinal grooves to sever the pipe.

A primary objective inherent in the above described apparatus and method of use is to provide advantages not taught by the prior art.

Another objective is to provide a simpler chain pipe cutter.

A further objective is to provide such a cutter that is more easily engaged with a clamping tool.

A still further objective is to provide such a cutter that is able to maintain its ends in circular alignment while being drawn into convergence.

Other features and advantages of the present invention will become apparent from the following more detailed description, taken in conjunction with the accompanying drawings, which illustrate, by way of example, the principles of the presently described apparatus and method of its use.

BRIEF DESCRIPTION OF THE SEVERAL VIEWS OF THE DRAWING(S)

Illustrated in the accompanying drawing(s) is at least one of the best mode embodiments of the present invention In such drawing(s):

FIGS. 4-8 are perspective views of the several components of the chain cutter.

DETAILED DESCRIPTION OF THE INVENTION

Figure 1:
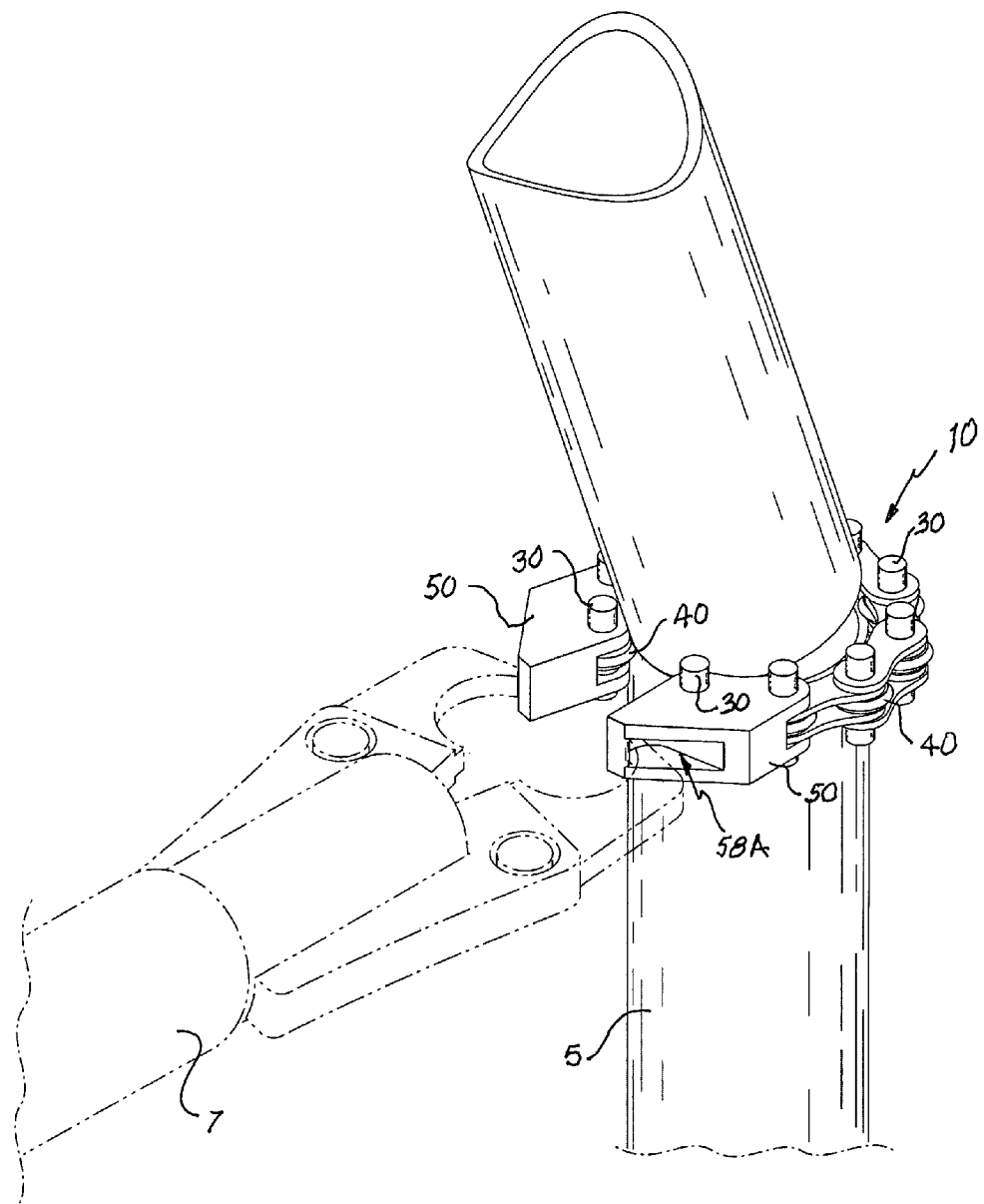
FIG. 1 is a perspective view of a first embodiment of the presently described apparatus, a chain cutter, shown severing a workpiece.

The above described drawing figures illustrate the described apparatus and its method of use in at least one of its preferred, best mode embodiment, which is further defined in detail in the following description. Those having ordinary skill in the art may be able to make alterations and modifications to what is described herein without departing from its spirit and scope. Therefore, it must be understood that what is illustrated is set forth only for the purposes of example and that it should not be taken as a limitation in the scope of the present apparatus and method of use.

Described now in detail, and shown in FIGS. 1-9, is a chain pipe-cutting apparatus comprising a flexible and non-extensible metal chain 10 made up using a plurality of chain links 20 joined together by cross bars 30, the cross bars 30 further engaging cutting wheels 40. A pair of adapters 50, each provides a U-shaped body having a pair of longitudinally oriented legs 52 joined together by a back portion 54 from which the legs 52 depend. The legs 52 each provide laterally oriented holes 56. This assembly comprises the present tool and is shown clearly in FIG. 2.

Figure 2:
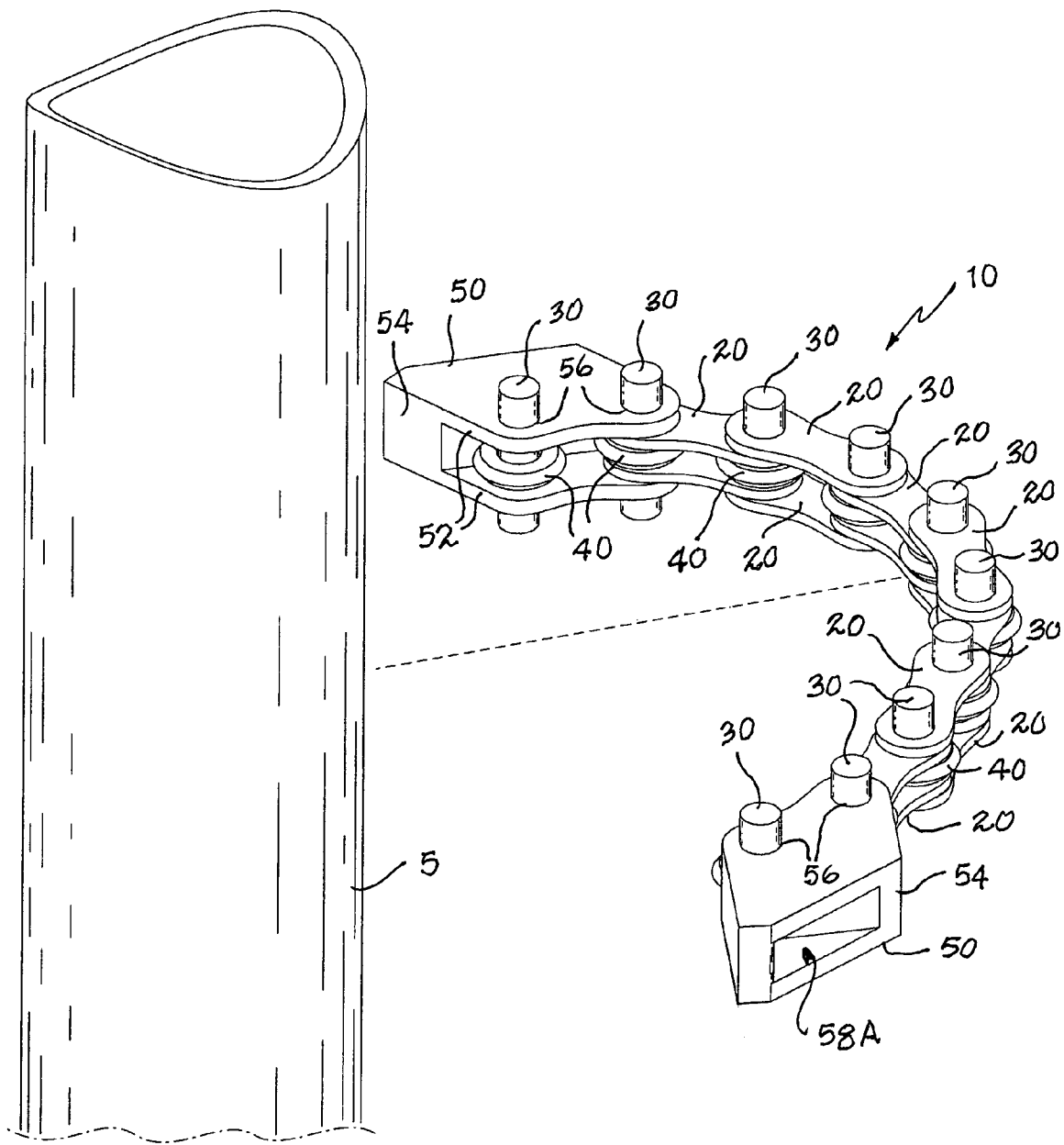
FIG. 2 is a further perspective view thereof showing the chain cutter being placed onto the workpiece.

As shown in FIG. 4, chain links 20 are elongated structural plates, preferably of steel construction, with a through hole 22 at each of its ends. Cross bars 30 are rods, preferably of steel construction. As shown in FIG. 6, each cross bar 30 engages four chain links 20, and a cutting wheel 40. As shown in FIG. 5, cutting wheels 40 each have a central hole 42. Again, as shown in FIG. 6, cutting wheel 40 is mounted on cross bar 30 and hole 42 is a clearance hole so that cutting wheel 40 is able to rotate on cross bar 30. Cutting wheel 40 is of such a diameter as to exceed the width of chin links 20 so that when chain 10 is placed onto a workpiece, the cutting wheels 40 contact the workpiece surface. Two chain links 20 are mounted onto cross bar 30 as well, and are positioned on either side of cutting wheel 40. Again, holes 22 in these two "inner" chain links 20 are clearance holes so that these two "inner" chain links 20 are able to rotate on cross bar 30. Finally, two further "outer" chain links 20 are mounted onto cross bar 30 in outside positions relative to the "inner" chain links 20, and the holes 22 in these "outer" links 20 are of such diameter that cross bar 30 is a press fit into these holes 22 so that the "outer" links 20 cannot rotate on cross bar 30 and the "outer" links 20 capture the "inner" links 20 and the cutting wheel 40 on cross bar 30. As shown in FIG. 6, the four links 20 are directed away from the cross bar 30 with the "inner" and "outer" links 20 in opposing directions. This assembly of one cross bar 30, one cutting wheel 40, and four chain links 20, comprise a unit 12 of the chain 10, where chain 10 is made up of a plurality of such units 12 joined to each other to form a linear arrangement as shown in FIG. 2. Clearly, alternate chain link construction could be used in the present invention and would be easily substituted for the present construction by those of skill in the art.

In the preferred embodiments, adapters 50 are mounted an terminal ends of chain 10. In one embodiment as shown in FIG. 2, the adapter 50 is mounted on a pair of the "inner" links 20 where the "inner" links 20 engage with only one cross bar 30 in adapter 50, which is mounted in one pair of holes 56 in adapter 50. In an alternate embodiment(not shown), the "inner" links 20 might terminate one end of chain 10, as engaged with adapter 50 on two cross bars 30 in two pairs of holes 56. In this latter case the links 20 are both fully positioned between legs 52, while in the former case only one end of the links 20 are positioned within legs 52. Holes 56 are preferably clearance holes so that adapters 50 are able to rotate an cross bars 30.

Figure 3:
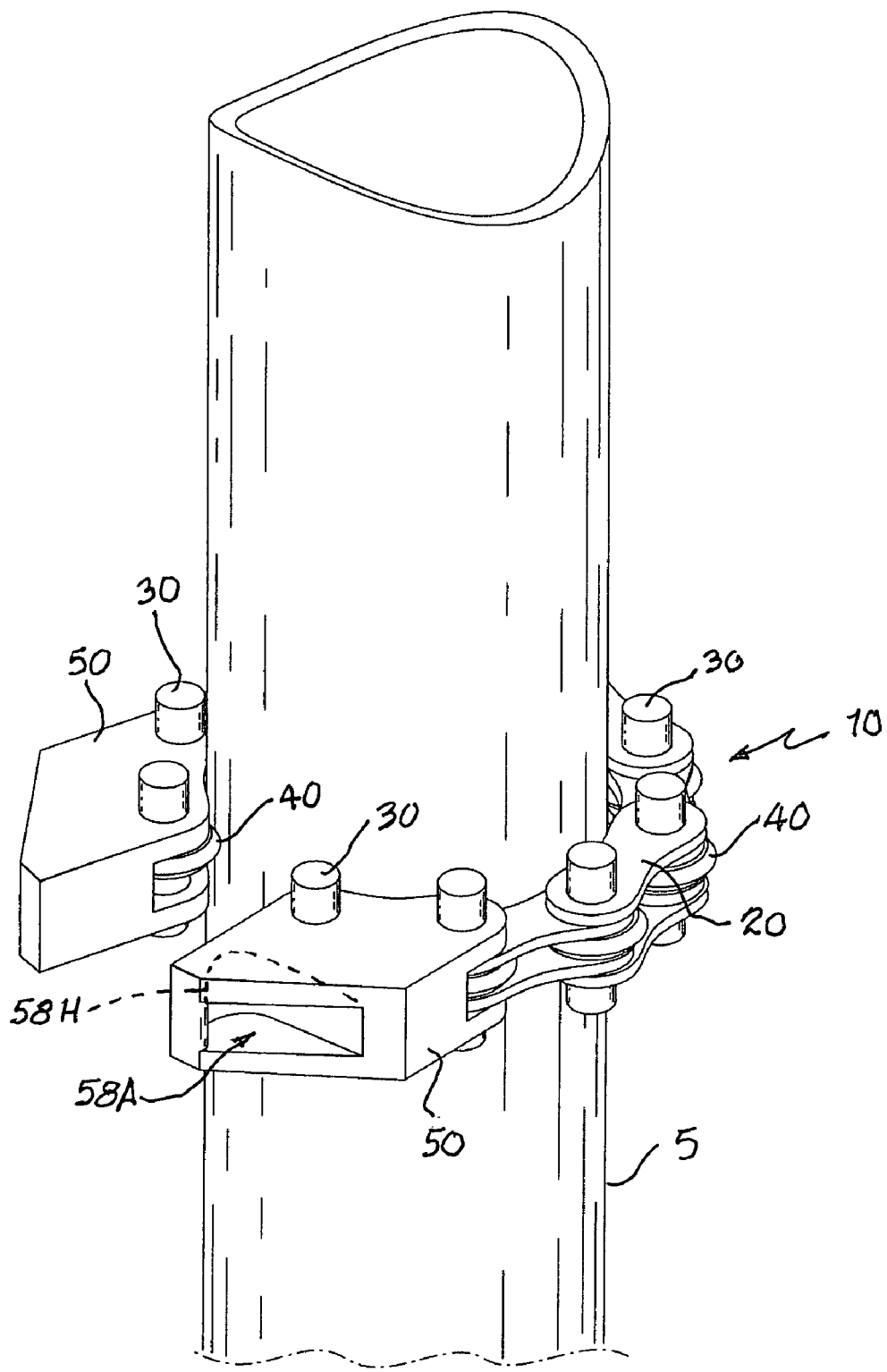
FIG. 3 is a further perspective view thereof showing the chain cutter in position on the workpiece.

Each one of the back portions 54 provides a clamping groove 58A which is longitudinally oriented as shown and has a hooked end 58H as best seen in FIG. 3, the hooked end 58H is able therefore to engaged a finger of a clamping tool 7 so that the tool 7 is not able to slip away from adapter 50. With the chain 10 wrapped around a brittle pipe 5, i.e., a pipe made of a fractile material such as cast iron or clay, so that the adapters 50 are in near adjacency, as shown in FIG. 3, the adapters may then be further forced into mutual convergence by the clamping tool 7 engaging both clamping grooves 58A, thereby causing the cutting wheels 40 to cut into and sever the pipe 5 (the workpiece).

Figure 9:
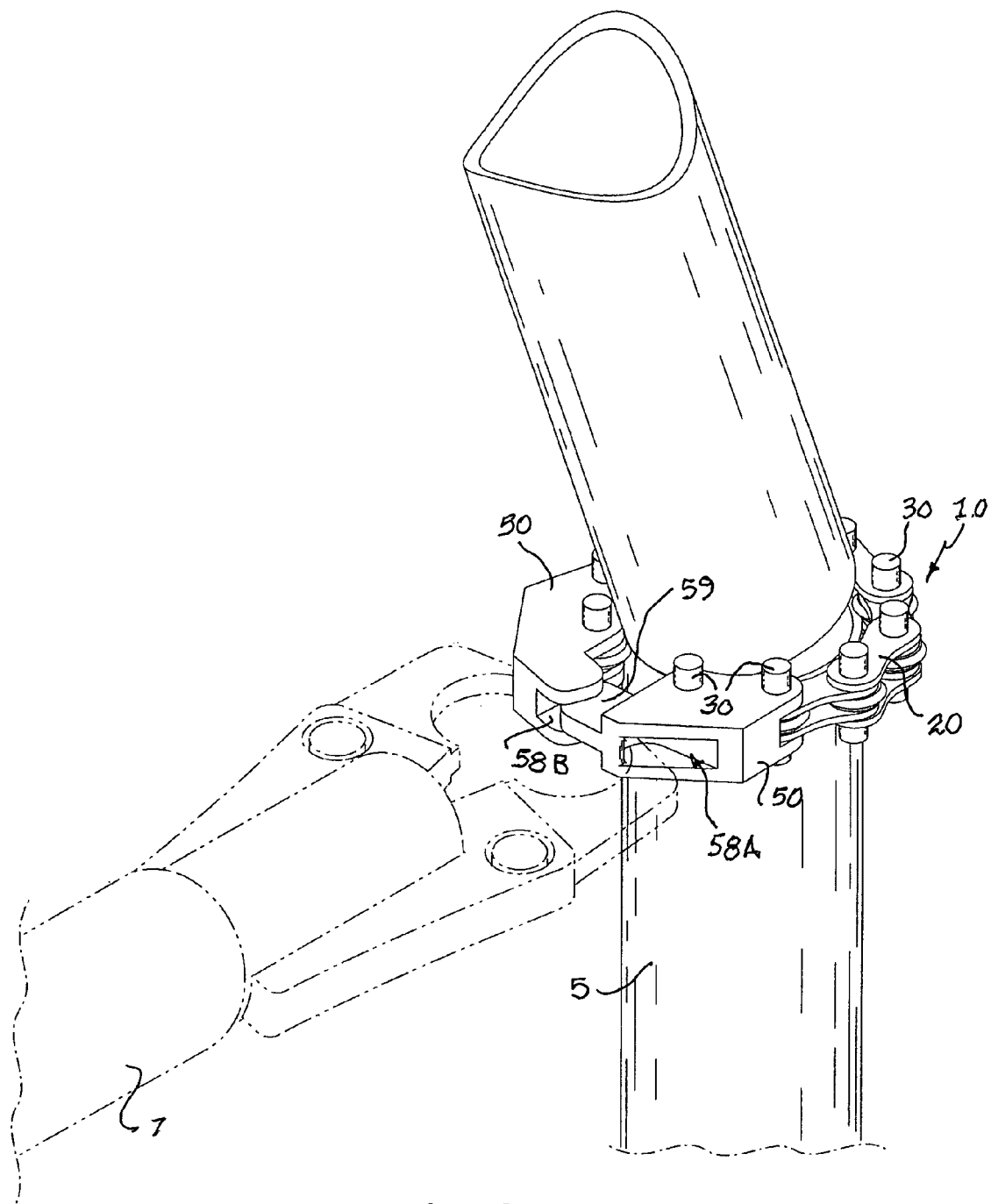
FIG. 9 is a perspective view of a second embodiment of the presently described apparatus, shown severing the workpiece.

As shown in FIG. 9, one of a pair of the adapters 50 may further provide a guide groove 58B and the other of the pair of adapters 50 may provide a guide tongue 59. In this case, when the adapters 50 are in the position shown in FIG. 9, encircling pipe 5 and ready to be drawn together in convergence, the guide groove 58B and the guide tongue 59 are positioned and capable of mutual engagement as the adapters are drawn together thereby preventing the adapters 50 and the chain 10 from moving out of circular alignment during the converging process. Clearly, beside a tongue in groove enablement, one of skill may provide alternate means for guiding the adapters 50 together.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. A workpiece-cutting apparatus for being compressively drawn by a clamping tool around a workpiece, the apparatus comprising: a flexible, non-extensible metal chain having a plurality or cutting wheels aligned longitudinally along the metal chain and rotationally engaged therewith; opposing ends of the metal chain each terminating with an adapter; each said adapter providing a pair of legs supporting therebetween at least one of the cutting wheels; each said adapter further having a clamping groove longitudinally extensive and directed along the adapter without extending through the adapter; the apparatus circularly configurable for encircling a workpiece with each said pair of legs directed toward the workpiece and with each said clamping groove directed away from the workpiece; wherein one of the adapters further provides a guide groove and another of the adapters provides a guide tongue; the guide groove and the guide tongue engagable when the apparatus is circularly configured, whereby, when the adapters are drawn together, contact forces of the cutting wheels sever the workpiece.

2. A workpiece-cutting tool apparatus positioned around a workpiece for being compressively drawn by a clamping tool, the apparatus comprising: a flexible, non-extensible metal chain having a plurality of cutting wheels aligned longitudinally along the metal chain and rotationally engaged therewith; opposing ends of the metal chain each terminating with an adapter; each said adapter providing a pair of legs supporting therebetween at least one of the cutting wheels; each said adapter further providing a clamping groove; the apparatus encircling the workpiece with each said pair of legs directed toward the workpiece and with the cutting wheels in contact with the workpiece; and each said clamping groove longitudinally extensive and directed along the adapter without extending through the adapter and directed away from the workpiece; whereby, when the adapter are drawn together, contact forces of the cutting wheels sever the workpiece.

3. The workpiece-cutting tool apparatus positioned around a workpiece for being compressively drawn by a clamping tool of claim 2 further comprising; wherein one said adapter has a guide groove and another said adapter provides a guide tongue; the guide groove and the guide tongue are engagable when the apparatus is circularly configured, whereby, as the adapters are drawn together by the clamping tool, the engagement of the guide tongue in the guide groove is positioned to prevent the metal chain from moving out of circular alignment.

4. A workpiece-cutting apparatus for being compressively drawn by a clamping tool around a workpiece, the apparatus comprising: a flexible, non-extensible metal chain having a plurality of cutting wheels aligned longitudinally along the metal chain and rotationally engaged therewith; opposing ends of the metal chain each terminating with an adapter; each said adapter providing an elongate clamping groove longitudinally extensive and directed along the adapter; the apparatus circularly configurable for encircling a workpiece with each said clamping groove directed away from the workpiece.

5. The workpiece-cutting apparatus for being compressively drawn by a clamping tool around a workpiece of claim 4 further comprising; wherein one said adapter has a guide groove and another said adapter provides a guide tongue; the guide groove and the guide tongue engagable when the apparatus is circularly configured, whereby, as the adapters are drawn together by the clamping tool, the engagement of the guide tongue in the guide groove is positioned to prevent the metal from moving out of circular alignment.

* * * * *